(12) United States Patent
Miyashiro

(10) Patent No.: US 9,254,888 B2
(45) Date of Patent: Feb. 9, 2016

(54) STRADDLE-TYPE ELECTRIC VEHICLE

(71) Applicant: YAMAHA HATSUDOKI KABUSHIKI KAISHA, Iwata-shi, Shizuoka (JP)

(72) Inventor: Shidehiko Miyashiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/366,740

(22) PCT Filed: Dec. 17, 2012

(86) PCT No.: PCT/JP2012/082653
§ 371 (c)(1),
(2) Date: Jun. 19, 2014

(87) PCT Pub. No.: WO2013/094559
PCT Pub. Date: Jun. 27, 2013

(65) Prior Publication Data
US 2014/0339007 A1 Nov. 20, 2014

(30) Foreign Application Priority Data

Dec. 22, 2011 (JP) ................................. 2011-280753
Dec. 4, 2012 (JP) ................................. 2012-265124

(51) Int. Cl.
B62M 7/12 (2006.01)
B62K 11/10 (2006.01)
(Continued)

(52) U.S. Cl.
CPC .............. *B62M 7/12* (2013.01); *B60L 11/1805* (2013.01); *B60L 11/1818* (2013.01);
(Continued)

(58) Field of Classification Search
CPC ........... B62K 2204/00; B62K 2208/00; B62K 11/04; B62K 11/00; B62K 2202/00
See application file for complete search history.

(56) References Cited

U.S. PATENT DOCUMENTS 8,662,232 B2 * 3/2014 Nakamura et al. ............ 180/220
2005/0029033 A1 2/2005 Rip et al.
(Continued)

FOREIGN PATENT DOCUMENTS

CN 2839089 Y 11/2006
CN 201201683 Y 3/2009
(Continued)

OTHER PUBLICATIONS

Official Communication issued in corresponding Taiwanese Patent Application No. 101149184, mailed on Aug. 13, 2014.
(Continued)

Primary Examiner — Kevin Hurley
(74) Attorney, Agent, or Firm — Keating and Bennett, LLP

(57) ABSTRACT

A straddle-type electric vehicle includes a seat disposed farther forward than a rear wheel, foot rest portions configured to support feet of an occupant seated on the seat, stands between a front wheel and the rear wheel and supported so as to swing, a leg shield including a surface which extends in a vertical direction, a receptacle facing an opening portion provided in the leg shield, and a body frame which supports the front wheel, the rear wheel, the seat, the stands, the leg shield, and the receptacle. The receptacle is disposed between a ground contact point of the front wheel and the leg shield; includes a connecting port which is opened to the top, left, or top left; and is configured so that a force received by the receptacle via the body frame when a charging plug is fitted therein is transmitted to the front wheel.

5 Claims, 5 Drawing Sheets

(51) Int. Cl.
  *B62J 23/00* (2006.01)
  *B62K 11/06* (2006.01)
  *B62K 19/46* (2006.01)
  *B60L 11/18* (2006.01)

(52) U.S. Cl.
  CPC ........ *B60L 11/1846* (2013.01); *B60L 11/1877* (2013.01); *B62J 23/00* (2013.01); *B62K 11/06* (2013.01); *B62K 11/10* (2013.01); *B62K 19/46* (2013.01); *B60L 2200/12* (2013.01); *B60L 2270/34* (2013.01); *B60L 2270/36* (2013.01); *B62K 2202/00* (2013.01); *B62K 2204/00* (2013.01)

(56) References Cited

U.S. PATENT DOCUMENTS

| | | | |
|---|---|---|---|
| 2010/0252554 | A1 | 10/2010 | Eguchi et al. |
| 2011/0061960 | A1* | 3/2011 | Matsuoka et al. ............ 180/220 |
| 2012/0199409 | A1 | 8/2012 | Nakamura et al. |
| 2012/0235639 | A1* | 9/2012 | Hamauzu ..................... 320/109 |
| 2013/0143432 | A1* | 6/2013 | Yamashita et al. ........... 439/503 |
| 2013/0270022 | A1* | 10/2013 | Matsuda ....................... 180/220 |
| 2013/0270026 | A1* | 10/2013 | Matsuda ....................... 180/220 |
| 2014/0319907 | A1* | 10/2014 | Yamazaki ..................... 307/9.1 |

FOREIGN PATENT DOCUMENTS

| | | |
|---|---|---|
| CN | 101428665 A | 5/2009 |
| EP | 2 236 403 A2 | 10/2010 |
| EP | 2 295 316 A2 | 3/2011 |
| JP | 04-358980 A | 12/1992 |
| JP | 2004-210074 A | 7/2004 |
| JP | 2005-502531 A | 1/2005 |
| JP | 2010-241234 A | 10/2010 |
| JP | 2011-63051 A | 3/2011 |
| JP | 2011-63066 A | 3/2011 |
| JP | 2011-63074 A | 3/2011 |
| TW | M382921 U1 | 6/2010 |
| TW | 201102284 A | 1/2011 |
| WO | 03/022671 A2 | 3/2003 |
| WO | WO 2011033967 A1 * | 3/2011 |

OTHER PUBLICATIONS

Official Communication issued in International Patent Application No. PCT/JP2012/082653, mailed on Feb. 19, 2013.

Official Communication issued in corresponding European Patent Application No. 12860115.0, mailed on Apr. 14, 2015.

* cited by examiner

STRADDLE-TYPE ELECTRIC VEHICLE

BACKGROUND OF THE INVENTION

1. Field of the Invention

The present invention relates to a straddle-type electric vehicle including an electric motor as a drive source.

2. Description of the Related Art

An electric motorcycle which uses an electric motor as a drive source includes a receptacle for charging a battery. When the battery is charged, a charging plug which is provided at an end portion of a cable which extends from a charger is connected to the receptacle.

As an electric motorcycle of this type, there is a known electric motorcycle in which an opening is provided in a rear surface of a front cover provided between a foot rest and a front wheel and which extends in a vertical direction, and a receptacle (a feeding portion) for charging the battery is provided in a position which is exposed by the opening (for example, refer to Taiwanese Unexamined Patent Publication No. 201102284).

When an electric motorcycle of this type is charged, the vehicle needs to be fixed in place. Then, a stand provided on the vehicle is rotated downwards to fix the vehicle. Thereafter, a lid is opened to expose the receptacle, and the charging plug is fitted in the receptacle.

In the electric motorcycle described in Taiwanese Unexamined Patent Publication No. 201102284, since the receptacle is provided in the cover which is provided in front of the legs of the occupant who is seated on a seat, the charging is easy.

However, being different from an electric four-wheeled vehicle, an electric motorcycle is light in weight. Because of this, when a force is applied to the vehicle as a result of the charging plug being fitted in the receptacle, there is a concern that the vehicle may move.

SUMMARY OF THE INVENTION

Preferred embodiments of the present invention provide a straddle-type electric vehicle which prevents the movement of the vehicle even though a force is applied thereto when a charging plug is fitted in a receptacle to facilitate charging. According to a preferred embodiment of the present invention, a straddle-type electric vehicle includes a front wheel and a rear wheel; a seat at least a portion of which is disposed farther forward than the rear wheel; a foot rest portion which is provided farther rearward than the front wheel and farther forward than the rear wheel and configured to support feet of an occupant seated on the seat from below; a stand located between the front wheel and the rear wheel and configured so as to swing and to support the vehicle in an upright state when the stand is rotated downwards by using a front portion as a fulcrum; a leg shield which is provided between the foot rest portion and the front wheel and which includes a surface which extends in an up-and-down direction; a receptacle which is provided so as to face an opening portion which is provided in the leg shield; and a body frame which supports the front wheel, the rear wheel, the seat, the stand, the leg shield, and the receptacle; wherein the receptacle is disposed between a ground contact point of the front wheel when the stand is rotated downwards and the leg shield, the receptacle including a connecting port which opens to the top, left, or top-left and arranged so as to transmit a force which the receptacle receives via the body frame when a charging plug is fitted therein to the front wheel.

According to a preferred embodiment of the straddle-type electric vehicle, the receptacle is disposed between the ground contact point of the front wheel and the leg shield. The connecting port of the receptacle opens to the top, left, or top-left. The receptacle is disposed so that the force received by the receptacle via the body frame when the charging plug is fitted therein and acting towards the bottom, right, or bottom right is transmitted to the front wheel. With the stand rotated downwards, the front wheel contacts the ground. Consequently, the force received by the receptacle which is disposed between the ground contact point of the front wheel and the leg shield when the charging plug is fitted therein acts toward the bottom, right, or bottom right on the front wheel, such that the front wheel is kept firmly in contact with the ground. Additionally, since a forward force component received by the receptacle is relatively small, the force which is applied to the body in a direction in which the stand is rotated upwards is reduced. Consequently, it is possible to provide a straddle-type electric vehicle which prevents the movement of the vehicle even though the force is applied thereto when the charging is started to facilitate the start of the charging.

In addition, in the straddle-type electric vehicle according to a preferred embodiment of the present invention, the receptacle may be provided in a position which is offset rightward or leftward with respect to a center of the vehicle.

According to a preferred embodiment of the straddle-type electric vehicle, the receptacle may be disposed in a position located near the front wheel so as to avoid the body frame which is disposed on a center line of a body in a left-and-right direction. Consequently, the force applied to the vehicle when the charging plug is connected is easily transmitted to the front wheel. Because of this, it is possible to provide a straddle-type electric vehicle which prevents the movement of the vehicle even though the force is applied to the vehicle when the charging plug is fitted in the receptacle to facilitate the start of charging.

In the straddle-type electric vehicle according to a preferred embodiment of the present invention, the body frame includes a body frame front portion which is disposed on the center line of the vehicle between the ground contact point of the front wheel and the leg shield, and the receptacle is supported on the body frame front portion.

According to a preferred embodiment of the straddle-type electric vehicle, the receptacle is supported on the body frame front portion near the front wheel. Because of this, a load generated when the charging plug is connected is easily transmitted to the front wheel via the body frame front portion. Consequently, it is possible to provide a straddle-type electric vehicle which prevents the movement of the vehicle even though the force is applied to the vehicle when the charging plug is fitted in the receptacle to facilitate the start of charging.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
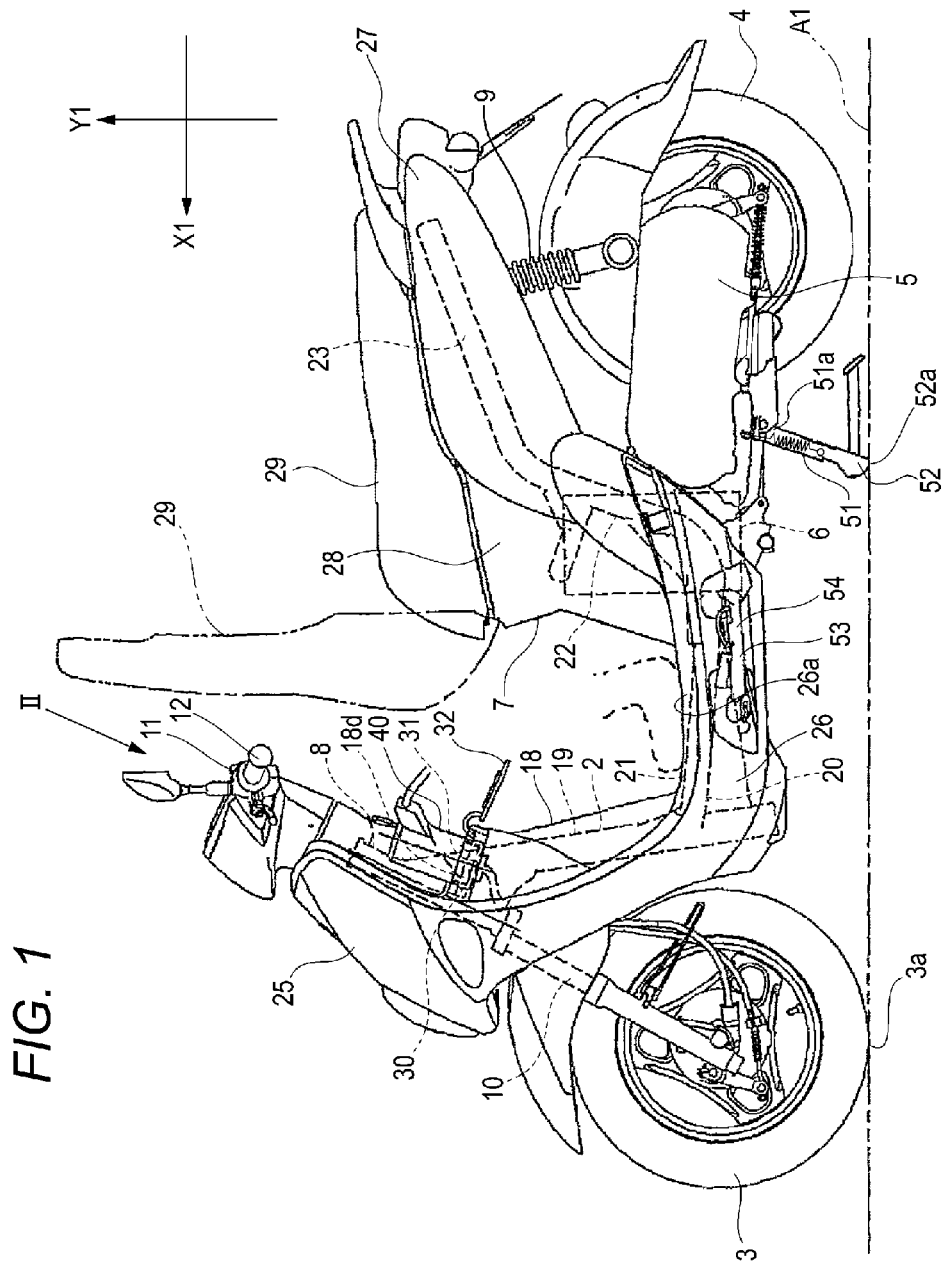
FIG. 1 is a side view of an electric motorcycle according to a first preferred embodiment of the present invention.
Figure 2:
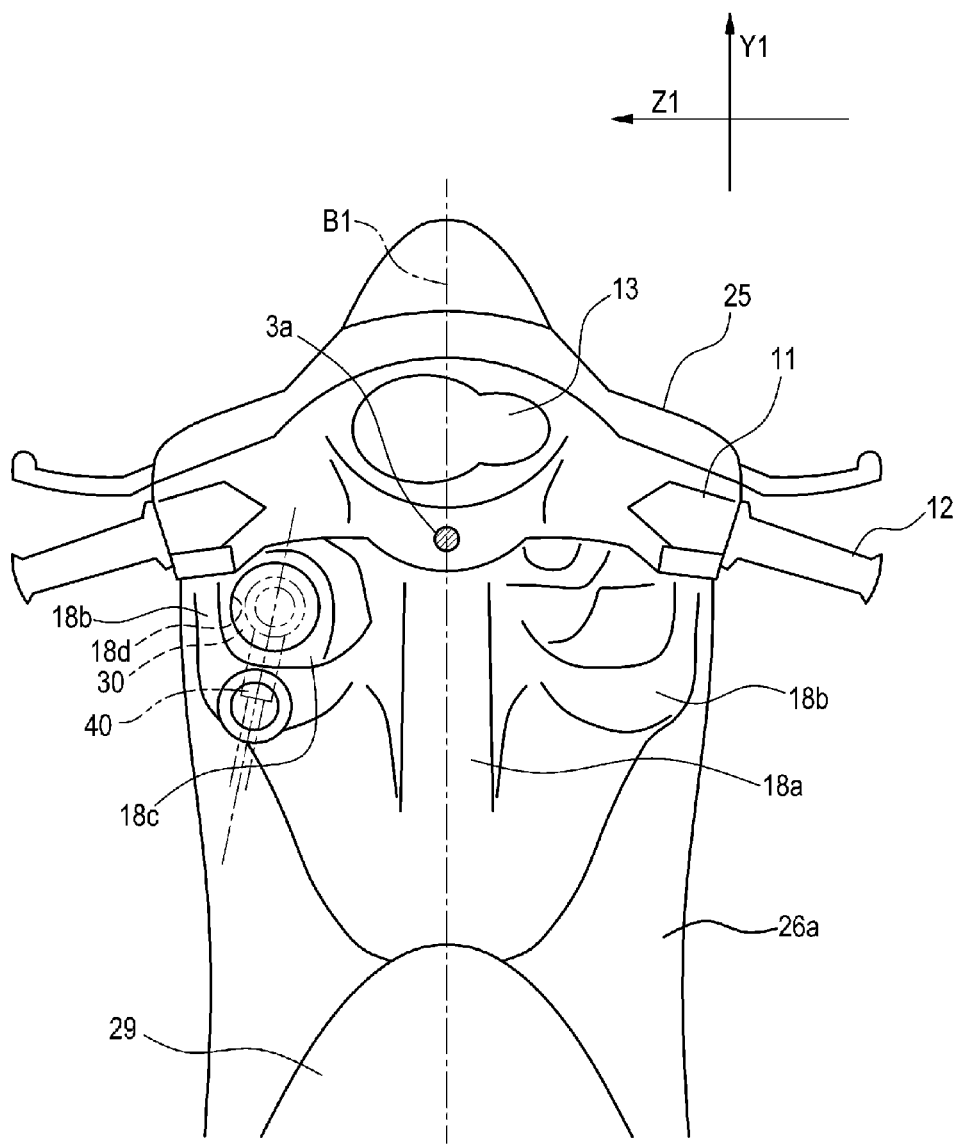
FIG. 2 is a plan view of the electric motorcycle shown in FIG. 1 as viewed in a direction indicated by an arrow II.

Hereinafter, referring to the drawings, preferred embodiments of the present invention will specifically be described. FIG. 1 is a left side view of an electric motorcycle according to a first preferred embodiment of the present invention. FIG. 2 is a plan view of the electric motorcycle shown in FIG. 1 as viewed in a direction indicated by an arrow II.

It is noted that in the following description, directions denoted as front, rear, top, bottom, left, and right are based on a viewing direction of a rider who rides on an electric motorcycle disposed on a horizontal plane, and who faces a forward traveling direction of the electric motorcycle. In FIG. 1, a front-and-rear direction is denoted by an arrow X1 and an up-and-down direction is denoted by an arrow Y1. In FIG. 2, a left-and-right direction is denoted by an arrow Z1. In addition, the configuration of the electric motorcycle will be described based on the electric motorcycle parked in an upright state with a main stand rotated downward.

The electric motorcycle includes a body frame 2, a front wheel 3, a rear wheel 4, a power unit 5 including an electric motor, a battery 6, a body cover 7, and a seat 29. In the electric motorcycle, the electric motor is driven by electric power supplied from the battery 6, and the rear wheel 4 is driven by an output of the electric motor. Hereinbelow, an overall construction of the electric motorcycle will be described sequentially from the front of a body thereof.

The electric motorcycle includes a head pipe 8 disposed at a top front portion of the electric motorcycle. A steering shaft is rotatably inserted into the head pipe 8. A front fork 10 is mounted at a lower end portion of the steering shaft. The front wheel 3 is mounted to the front fork 10 and is supported by the body frame 2.

A handlebar 11 is mounted at an upper end portion of the steering shaft. The rider is able to rotate the steering shaft, the front fork 10, and the front wheel 3 about an axis of the steering shaft by controlling the handlebar 11.

Grips 12 are provided individually at both left and right end portions of the handlebar 11 (refer to FIG. 2). A right-hand grip includes a throttle grip. The rider can rotate this throttle grip to control the output of the electric motor. Additionally, a meter 13 is provided near a center of the handlebar 11.

The electric motorcycle includes the body frame 2 which extends to the rear from the head pipe 8. The body frame 2 is made of steel tube members. The body frame 2 includes a down tube 19 and a frame main body 20 disposed at the rear of the down tube 19. The head pipe 8 and the down tube 19 define a body frame front portion.

The down tube 19 is disposed on a centerline of the vehicle with respect to the left-and-right direction. The down tube 19 extends downward diagonally from a lower portion of the head tube 8. As viewed from the side, the frame main body 20 extends to the rear from a lower end portion of the down tube 19, and an intermediate portion of the down tube 19 in the front-and-rear direction X1 of the vehicle has an S-shape.

The frame main body 20 includes a pair of left and right front main bodies 20, each frame main body 20 including a first frame portion 21, a second frame portion 22, and a third frame portion 23.

The first frame portion 21 extends straight or substantially straight to the rear from the lower end portion of the down tube 19 and is inclined slightly rearward and diagonally upward. A side stand 53 is mounted at a left-hand side of the first frame portion 21 so as to be able to rotate downwards. The side stand 53 is disposed between the front wheel 3 and the rear wheel 4.

The second frame portion 22 has an S-shape as viewed from the side thereof. The second frame portion 22 is curved from bottom to top. A front end of the second frame portion 22 extends from a rear end portion of the first frame portion 21, an intermediate portion of the second frame portion 22 extends straight rearward and diagonally upward, and a rear end portion thereof extends to the third frame portion 23. When viewed from the side, an inclination angle of the intermediate portion of the second frame portion 22 relative to the first frame portion 21 is, for example, on the order of about 45 degrees, for example. The third frame portion 23 extends in a straight line from an upper end portion of the second frame portion 22 and is inclined slightly rearward and diagonally upward.

As shown in FIG. 1, the electric motorcycle includes the body cover 7 which is mounted on the body frame 2. The body cover 7 includes a front cover 25 which covers the head pipe 8, a leg shield 18, a bottom cover 26, a rear cover 27, and an under-seat cover 28.

The bottom cover 26 extends to the rear from a lower portion of the front cover 25 to cover the first frame portion 21. Foot rest portions 26a are provided at an upper end portion of the bottom cover 26 which is provided farther rearward than the front wheel 3 and farther forward than the rear wheel 4. The foot rest portions 26a are flat or substantially flat and support the feet of the rider seated on the seat 29 from below.

The leg shield 18 is provided between the foot rest portions 26a and the front wheel 3 and includes a surface which extends in the vertical direction. The leg shield 18 is provided at a rear side of the front cover 25 and covers the down tube 19 together with the front cover 25. The leg shield 18 extends from the rear side of the front cover 25 to the foot rest portions 26a.

As shown in FIG. 2, the leg shield 18 includes a frame covering portion 18a at a center in the left-and-right direction of the vehicle and leg protecting portions 18b which are provided at the left and right of the frame covering portion 18a. The leg protecting portions 18b are provided individually at left and right end portions of the leg shield 18 so as to protect the legs of the rider seated on the seat 29. The frame covering portion 18a projects farther rearward than the leg protecting portions 18b so as to cover the down tube 19 which extends rearward and diagonally upward from the head tube 8.

Additionally, as shown in FIG. 1, the rear cover 27 covers the second frame portion 22 and the third frame portion 23. The rear cover 27 has an overall shape which extends rearward and diagonally upward from a rear portion of the bottom cover 26. The rear cover 27 covers from an intermediate portion of the second frame portion 22 to the third frame portion 23 from the left and right sides thereof.

The under-seat cover 28 extends upward from the rear portion of the bottom cover 26 to below the seat 29 and at the front of the rear cover 27.

The seat 29 is disposed above the under-seat cover 28 and the rear cover 27. A front portion of the seat 29 is located farther towards the front of the vehicle than the rear wheel 4. While the electric motorcycle is running, the feet of the rider seated on the seat 29 rest on the foot rest portions 26a. In the front-and-rear direction X1, the foot rest portions 26a are disposed between the leg shield 18 and the under-seat cover 28.

Additionally, the seat 29 is mounted on the under-seat cover 28 via a hinge at a front portion thereof, such that a storage space provided below the seat 29 can be opened and closed by the seat 29.

The battery 6, which functions as a power supply for the electric motor, is disposed below the seat 29. The battery 6 is disposed between the pair of left and right second frame portions 22. The battery 6 is a secondary battery which is rechargeable. It is noted that the battery 6 may be configured so as to be detached from the vehicle.

In addition, the power unit 5 is provided at the rear of the first frame portion 21 and below the third frame portion 23. The power unit 5 is mounted on the third frame portion 23 so as to swing via a suspension unit 9. A main stand 51 is mounted at a lower portion of the power unit 5. As shown in FIG. 1, the main stand 51 is disposed between the front wheel 3 and the rear wheel 4.

The main stand 51 includes supporting portions 52 which project in the left-and-right direction of the vehicle. The main stand 51 is supported on the vehicle so as to be rotated downwards by using a front portion 51a thereof as a fulcrum. While the vehicle is running, the main stand 51 is rotated upwards by using the front portion 51a as the fulcrum, such that the supporting portions 52 are lifted up to an upper position so as to extend along the power unit 5. On the other hand, while the vehicle is parked, the main stand 51 is rotated downwards by using the front portion 51a as the fulcrum so that the rear wheel 4 is spaced away from a ground contact plane A1, such that the electric motorcycle is supported in an upright state.

The electric motorcycle configured as described above includes a receptacle 30 which is electrically connected with the battery 6. A charging plug 40 can be connected to the receptacle 30. The receptacle 30 includes a connecting port 31 into which a distal end of the charging plug 40 can be inserted. The receptacle 30 is configured so that the connecting port 31 faces an opening portion 18d provided in the leg shield 18. The receptacle 30 is fitted to a down tube 19.

A cap 32 is provided on the receptacle 30 so as to close the connecting port 31. When charging is not carried out, the cap 32 covers the connecting port 31 to prevent the intrusion of rain water or dust into an interior of the receptacle 30.

As shown in FIG. 2, a receptacle accommodating portion 18c is arranged on the left-hand leg protecting portion 18b of the leg shield 18 so as to project to the rear from the leg protecting portion 18b. An upper surface of the receptacle accommodating portion 18c defines a flat plane or a substantially flat plane. The opening portion 18d is provided in the receptacle accommodating portion 18c.

Figure 3:
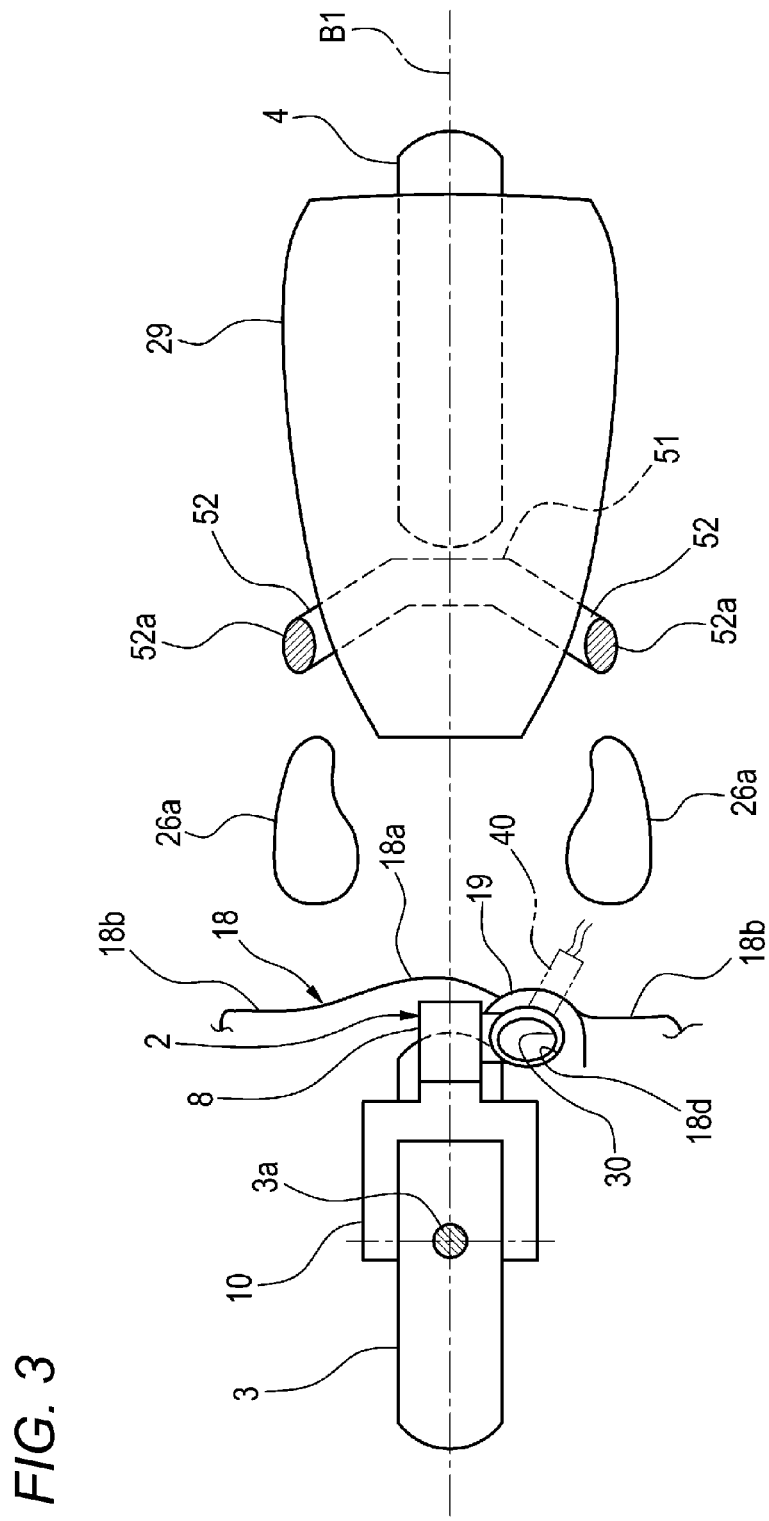
FIG. 3 is a schematic view showing a ground contact point and a receptacle of the electric motorcycle shown in FIG. 1 as viewed from above.

FIG. 3 is a schematic view which shows the ground contact point and the receptacle of the electric motorcycle shown in FIG. 1 from above. Hereinbelow, the operation of a force from the charging plug 40 applied when the battery 6 is started to be charged will be described with reference to FIGS. 1 and 3. The electric motorcycle according to the present preferred embodiment starts charging the battery 6 with the charging plug 40 fitted in the receptacle 30 in such a state that the main stand 51 is rotated downwards.

In such a state that the main stand 51 is rotated downwards to lower the supporting portions 52, as shown in FIG. 3, the front wheel 3 is in contact with the ground. In addition, in this state, the electric motorcycle is in contact with the ground with a ground contact point 3a of the front wheel 3 and two locations corresponding to the pair of left and right ground contact points 52a, 52a of the supporting portions 52. As this occurs, when the electric motorcycle is seen from above, the receptacle 30 is disposed between the ground contact point 3a of the front wheel 3 and the leg shield 18 and is disposed in a position located close to the front wheel 3.

In addition, as shown in FIG. 1, the connecting port 31 of the receptacle 30 opens upward. Because of this, when the distal end of the charging plug 40 is fitted in the connecting port 41 of the receptacle 30 to charge the battery 6, the charging plug 40 applies a force which is directed downward toward the receptacle 30.

Since the receptacle 30 is fixed to the down tube 19, the force applied to the receptacle 30 acts so as to push down on the down tube 19. Additionally, the front wheel 3 is fixed to the head pipe 8 which is integral with the down tube 19 via the front fork 10. Because of this, an external force applied to the down tube 19 acts so as to push down on the front wheel 3.

Consequently, when the charging plug 40 is fitted in the receptacle 30, the force applied to the receptacle 30 acts so as to pushdown on the front wheel 3 via the body frame 20. Because of this, the front wheel 3 is not moved thus maintaining the ground contact state of the front wheel 3 in a good condition.

In addition, in the force which is received by the receptacle 30, a downward force component is dominant, and a forward force component is relatively small. Because of this, the force which attempts to move the body forward is small, wherein the force which acts on the body in a direction in which the main stand 51 is rotated upward is reduced. This makes it difficult for the main stand 51 to be rotated upwards when charging is started, such that the posture of the vehicle is properly maintained. Consequently, even though the force is applied to the vehicle from the receptacle 30 when the charging is started, the movement of the vehicle is prevented thus facilitating the start of charging.

In the present preferred embodiment, the receptacle 30 is provided not in the frame covering portion 18a but in the left-hand leg protecting portion 18b of the leg shield 18. Namely, the receptacle 30 is provided in a position which is offset rightward or leftward with respect to a center line B1 of the vehicle which extends in the front-and-rear direction.

When the receptacle 30 is provided in the frame covering portion 18a, since the receptacle 30 is spaced far away from the ground contact point 3a of the front wheel 3, when connecting the charging plug 40 to the receptacle 30 it is difficult for the force which attempts to push down on the front wheel 3 to be transmitted thereto.

In the present preferred embodiment, however, the receptacle accommodating portion 18c is provided in the leg protecting portion 18b so that the receptacle 30 is disposed in the receptacle accommodating portion 18c. By using this configuration, as shown in FIG. 3, the receptacle 30 is disposed close to the front wheel 3 such that a force generated when the charging plug 40 is inserted into the receptacle 30 is easily transmitted to the front wheel 3. Consequently, no force is applied to the main stand 51, and hence, the vehicle does not move. Because of this, it is possible to provide an electric motorcycle which further facilitates the start of charging.

Figure 4:
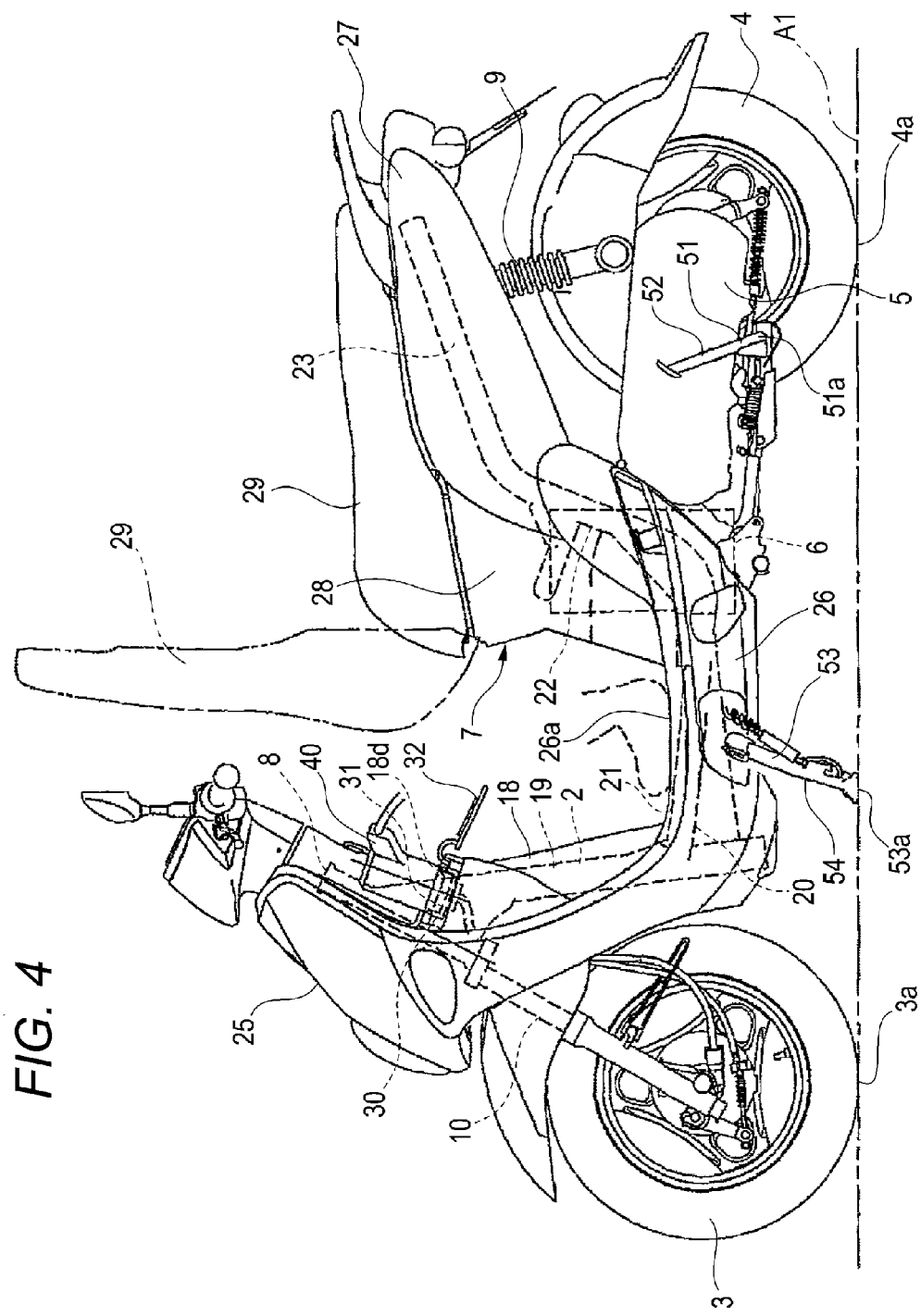
FIG. 4 is a side view of the electric motorcycle shown in FIG. 1 which shows a state in which a side stand is rotated downward.

In the description above, while the battery 6 has been described as preferably being charged in such a state that the supporting portions 52 of the main stand 51 are lowered, charging the battery 6 may be executed with the supporting portion 54 of the side stand 53 lowered. FIG. 4 is a side view of the vehicle with the supporting portion 54 of the side stand 53 lowered. Additionally, FIG. 5 is a schematic view showing a ground contacting state of the electric motorcycle shown in FIG. 4.

Figure 5:
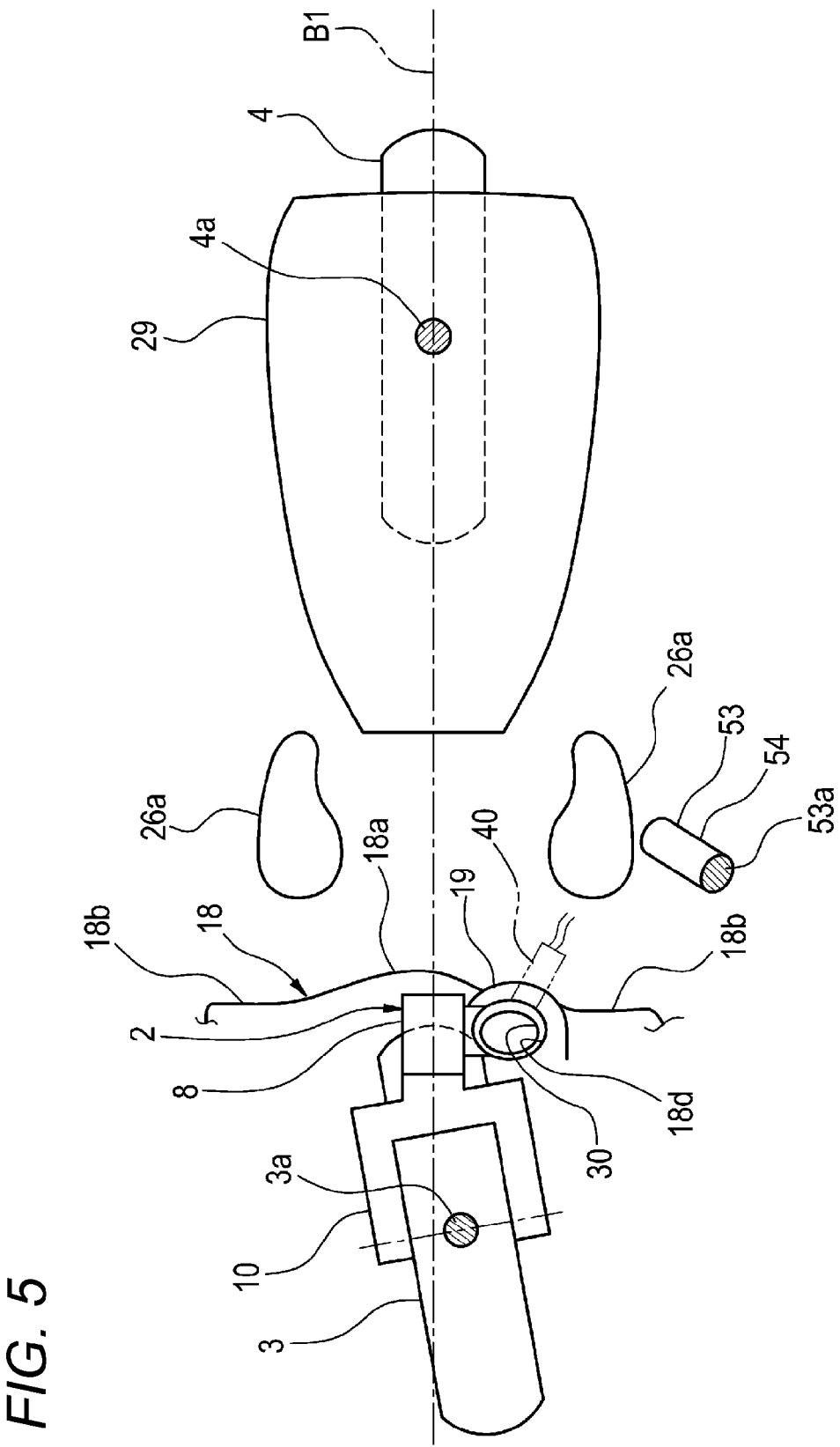
FIG. 5 is a similar view to FIG. 3 which shows a state in which the side stand is rotated downward. the present invention

As shown in FIGS. 4 and 5, with the side stand 53 lowered, the electric motorcycle is in contact with the ground preferably at three points including the ground contact point 3a of the front wheel 3, a ground contact point 4a of the rear wheel 4, and a ground contact point 53a of the side stand 53. Also, when the charging plug 40 is connected to the receptacle 30 in this state, the force applied to the receptacle 30 from the charging plug 40 is transmitted to the front wheel 3 via the body frame 2 as a force which pushes down on the front wheel 3. Because of this, the front wheel 3 does not move and the ground contact state of the front wheel 3 is maintained.

In addition, in the force which is received by the receptacle, a downward force component is dominant and a forward force component is relatively small. Because of this, the force which attempts to move the vehicle forward is small, and hence, the force which is applied to the body in a direction in which the side stand 53 is rotated upwards is reduced. Because of this, it is difficult for the side stand 53 to be rotated upwards at the start of charging, such that the posture of the vehicle is properly maintained. Consequently, even though the force is applied to the vehicle from the receptacle 30 when charging is started, the movement of the vehicle is prevented thus facilitating the start of charging.

In the preferred embodiments described above, while the connecting port 31 of the receptacle 30 has been described as preferably opening upwards, the present invention is not limited thereto. The connecting port 31 may be provided so as to open to the left or to the top-left.

For example, even in the event that the receptacle 30 is disposed so that the connecting port 31 opens to the left, the receptacle 30 is disposed near the front wheel 3. Because of this, a force directed to the right is applied to the front wheel 3 via the body frame 2, such that the front wheel 3 does not move in the front-and-rear direction, and the ground contact state of the front wheel 3 is maintained.

Additionally, in the force which is received by the receptacle 30, a rightward force component is dominant and a forward force component is relatively small. Because of this, the force which attempts to move the body forward is small, such that the force which is applied to the body in a direction in which the main stand 51 and the side stand 53 are rotated upwards is reduced. Because of this, it is difficult for the main stand 51 and the side stand 53 to be rotated upwards when charging is started, such that the posture of the vehicle is properly maintained. Consequently, even though the force is applied to the vehicle from the receptacle 30 when the charging is started, the movement of the vehicle is prevented thus facilitating the start of charging.

Also, when the connecting port 41 is opened to the top-left, similarly, the front wheel 3 does not move in the front-and-rear direction, such that the ground contact state of the front wheel is maintained in a good condition. Additionally, the force which attempts to move the body forward is small. Because of this, it is difficult for the main stand 51 and the side stand 53 to be rotated upwards when charging is started, such that the posture of the vehicle is properly maintained.

In addition, when the connecting port 31 is opened to the left, it is easy for the rider who attempts to start the charging while standing on the left-hand side of the vehicle to connect the charging plug 40 to the receptacle 30.

Additionally, in the preferred embodiments described above, while the receptacle 30 has been described as preferably being connected directly to the down tube 19, a configuration may be used in which the receptacle 30 is supported indirectly on the body frame 2.

For example, the receptacle 30 maybe fixed to the leg shield 18. Due to the leg shield 18 being fixed to the body frame 2, when the charging plug 40 is fitted in the receptacle 30, the force applied to the receptacle 30 is applied to the body frame 2 via the leg shield 18 acting as a force which pushes down on the front wheel 3.

In addition, in the preferred embodiments described above, while the charging plug has been described preferably as a gun-type plug, a rectangular or substantially rectangular parallelepiped charging plug may be used in place of the gun-type plug.

In the preferred embodiments described above, while the present invention has been described as preferably being applied to the electric motorcycle, the present invention may be applied to other electric vehicles than the electric motorcycle, such as an electric tricycle or three-wheeled vehicle as long as they are a straddle-type vehicle.

In addition, various design alterations can be made to the various preferred embodiments of the present invention described above.

This patent application is based on Japanese Patent Application (No. 2011-280753) filed on Dec. 22, 2011 and Japanese Patent Application (No. 2012-265124) filed on Dec. 4, 2012, the entire contents of which are incorporated herein by reference.

According to the preferred embodiments of the present invention, the straddle-type electric vehicle prevents movement of the vehicle even though the force is applied to the vehicle when the charging plug is fitted in the receptacle, thus facilitating the charging.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A straddle-type electric vehicle comprising:
   a front wheel and a rear wheel;
   a seat at least a portion of which is disposed farther forward than the rear wheel;
   a foot rest portion located farther rearward than the front wheel and farther forward than the rear wheel and configured to support feet of an occupant seated on the seat from below;
   a stand located between the front wheel and the rear wheel and configured so as to swing and support the vehicle in an upright state when the stand is rotated downwards by using a front portion as a fulcrum;
   a leg shield provided between the foot rest portion and the front wheel and which includes a surface extending in an up-and-down direction;
   a receptacle arranged to face an opening portion provided in the leg shield; and
   a body frame which supports the front wheel, the rear wheel, the seat, the stand, the leg shield, and the receptacle; wherein
   the receptacle is disposed between a ground contact point of the front wheel in a state in which the stand is rotated downwards and the leg shield, the receptacle including a connecting port which opens to a top, a left, or a top-left and configured to transmit a force which the receptacle receives via the body frame when a charging plug is fitted therein to the front wheel.

2. The straddle-type electric vehicle according to claim 1, wherein the receptacle is provided in a position which is offset rightward or leftward with respect to a center of the vehicle.

3. The straddle-type electric vehicle according to claim 1, wherein the body frame includes a body frame front portion disposed on a center line of the vehicle between the ground contact point of the front wheel and the leg shield, and the receptacle is supported on the body frame front portion.

4. The straddle-type electric vehicle according to claim 1, wherein the force includes a downward force and a forward force, and the receptacle is configured such that the downward force is greater than the forward force.

5. The straddle-type electric vehicle according to claim 1, wherein the force includes a lateral force and a forward force, and the receptacle is configured such that the lateral force is greater than the forward force.

\* \* \* \* \*